United States Patent
Thompson et al.

(10) Patent No.: US 9,194,298 B2
(45) Date of Patent: Nov. 24, 2015

(54) FUEL BOOST MODULE

(71) Applicant: Solar Turbines Incorporated, San Diego, CA (US)

(72) Inventors: James Allen Thompson, Gun Barrel City, TX (US); Paul Alan LeBlanc, Kaufman, TX (US); Neil V. Fry, Mesquite, TX (US)

(73) Assignee: Solar Turbines Incorporated, San Diego, CA (US)

( * ) Notice: Subject to any disclaimer, the term of this patent is extended or adjusted under 35 U.S.C. 154(b) by 437 days.

(21) Appl. No.: 13/687,717

(22) Filed: Nov. 28, 2012

(65) Prior Publication Data
US 2014/0144140 A1 May 29, 2014

(51) Int. Cl.
*F02C 7/236* (2006.01)
*F01D 25/24* (2006.01)

(52) U.S. Cl.
CPC ............... *F02C 7/236* (2013.01); *F01D 25/24* (2013.01)

(58) Field of Classification Search
CPC ............ F02C 7/236; F02C 7/22; F02C 7/222; F02C 7/232; F02C 7/24; F02C 7/25; F02C 7/32; F02C 9/263; F02C 7/228; F05D 2240/90; F05D 2240/91; F01K 13/00; F01K 13/006; F23R 3/28
USPC .......................................................... 60/734
See application file for complete search history.

(56) References Cited

U.S. PATENT DOCUMENTS

| | | | |
|---|---|---|---|
| 6,442,925 B1* | 9/2002 | Dalton et al. | 60/39.094 |
| 2003/0056514 A1* | 3/2003 | Lohn | 60/734 |
| 2003/0154889 A1* | 8/2003 | Sedge | 108/54.1 |
| 2010/0126136 A1* | 5/2010 | Anson | 60/39.281 |
| 2011/0002778 A1* | 1/2011 | Strom et al. | 415/182.1 |
| 2011/0220525 A1* | 9/2011 | Moss | 206/386 |
| 2011/0271679 A1* | 11/2011 | Mestroni et al. | 60/734 |

OTHER PUBLICATIONS

"Draft Technical Specifications for GE Frame PG9171E Gas Turbine Generator and direct Auxiliaries and Limits of Supply." IICBA. Sep. 12, 2007, in 144 pages.
Siemens. Siemens Gas Turbine Package, SGT5-PAC 4000F. Application Overview. 2009, in 20 pages.

* cited by examiner

*Primary Examiner* — Ehud Gartenberg
*Assistant Examiner* — Filippo Manfredi
(74) *Attorney, Agent, or Firm* — Procopio, Cory, Hargreaves & Savitch LLP

(57) ABSTRACT

A fuel boost module for a gas turbine engine having a base, a fuel inlet configured to receive fuel from a fuel supply, a fuel outlet configured to deliver fuel to the gas turbine engine, a filter assembly configured to filter the fuel, a fuel controller configured to regulate pressure of the fuel that will be delivered to the gas turbine engine, a boost pump configured to pressurize the fuel, and a main pump configured to pressurize the fuel.

19 Claims, 3 Drawing Sheets

FUEL BOOST MODULE

TECHNICAL FIELD

The present disclosure generally pertains to gas turbine engines, and is more particularly directed toward a modular fuel supply system for a gas turbine engine.

BACKGROUND

Stationary gas turbine engines are typically assembled into a "turbine package" on a base. In particular, the gas turbine engine and certain support systems are installed on a support platform, keeping systems necessary to the turbine's operation together. In some instances, an auxiliary system may be located on a separate platform or "skid".

"Draft Technical Specifications for GE Frame PG9171E Gas Turbine Generator and direct Auxiliaries and Limits of Supply" IICBA-Sep. 12, 2007 Section 6.1.1.2 discusses "auxiliary systems and separate skids". In particular, the GE Draft Technical Specification identifies a liquid fuel system with one high pressure fuel pump, duplex high pressure fuel filters, and a flow divider. Also, Section 7.5.2 the GE Draft Technical Specification discusses off-base mechanical assemblies identifying a fuel oil forwarding skid and a fuel oil filtering skid.

The present disclosure is directed toward overcoming known problems and/or problems discovered by the inventors.

SUMMARY OF THE DISCLOSURE

A fuel boost module for a gas turbine engine is disclosed herein. The fuel boost module has a base, a fuel inlet configured to receive fuel from a fuel supply, a fuel outlet configured to deliver fuel to the gas turbine engine, a filter assembly configured to filter the fuel, a fuel controller configured to regulate pressure of the fuel that will be delivered to the gas turbine engine, a boost pump configured to pressurize the fuel, and a main pump configured to pressurize the fuel. According to one embodiment, a gas turbine engine is also disclosed herein. The gas turbine engine including a support platform, a compressor, a turbine, a combustor, at least one injector, and the above fuel boost module, configured to deliver fuel to the at least one injector.

DETAILED DESCRIPTION

The fuel boost module provides a single module for the fuel supply, fuel filter, fuel boost, fuel control to be located together and off the support platform of a gas turbine engine. All of the components are arranged in a way to be accessible for service and compact. The fuel boost module may be a portable unit that accommodates multiple fuel supply configurations.

Figure 1:
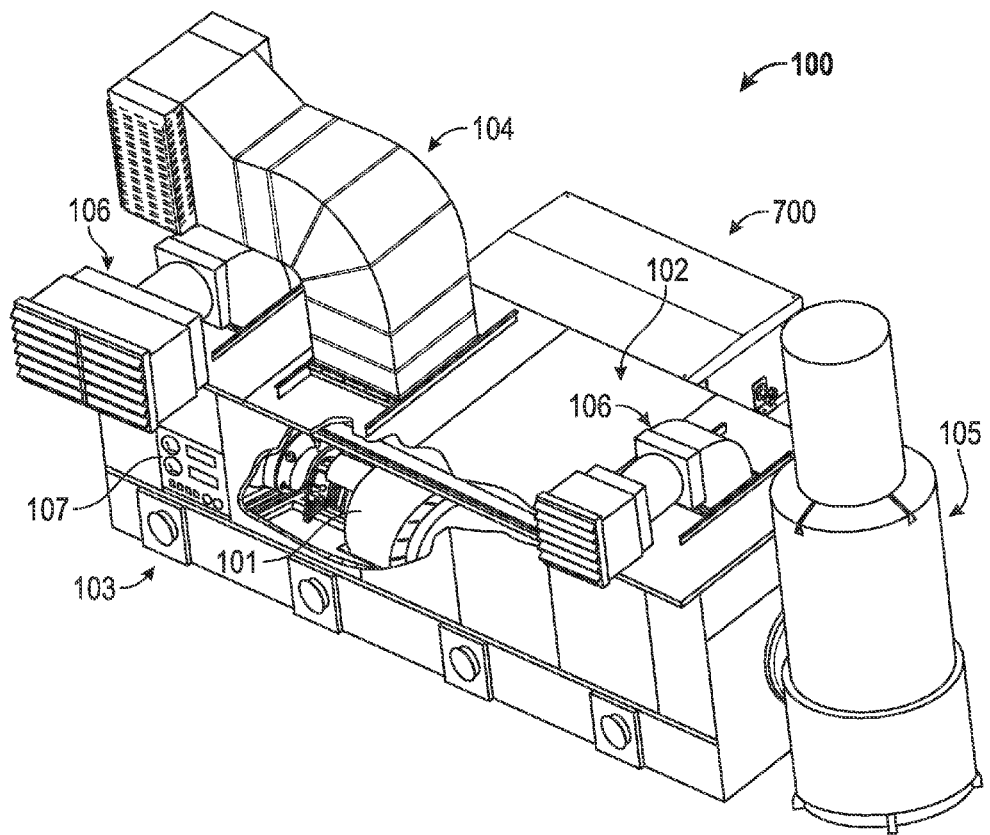
FIG. 1 is a cutaway isometric view of a gas turbine engine package.

FIG. 1 is a cutaway isometric view of a gas turbine engine package. Some of the surfaces have been left out or exaggerated (here and in other figures) for clarity and ease of explanation.

The gas turbine engine package 100 may include a gas turbine engine 101, an enclosure 102, and a support platform 103. The gas turbine engine 101 may be mounted to and supported by a support platform 103. In addition, the gas turbine engine 101 may be housed in an enclosure 102. The gas turbine engine package 100 may also include one or more auxiliary features such as an inlet duct 104, an exhaust duct 105, one or more vents 106, and a control panel 107, for example.

Generally, the gas turbine engine 101 includes an inlet, a compressor, a combustor, a turbine, an exhaust, and a power output coupling. One or more of the rotating components are coupled by one or more shafts.

Functionally, air enters the gas turbine engine inlet via the inlet duct 104 and is compressed by the compressor. Once compressed, air leaves the compressor, enters the combustor, where it is diffused and fuel is added. In particular, fuel is supplied to a plurality of fuel injectors from an off board fuel boost module 700. The fuel boost module 700 is located off of the support platform 103, but is fluidly coupled to the plurality of fuel injectors. After the combustion reaction, energy is then extracted from the combusted fuel/air mixture via the turbine. Exhaust gas then exits the system via the exhaust duct 105.

Figure 2:
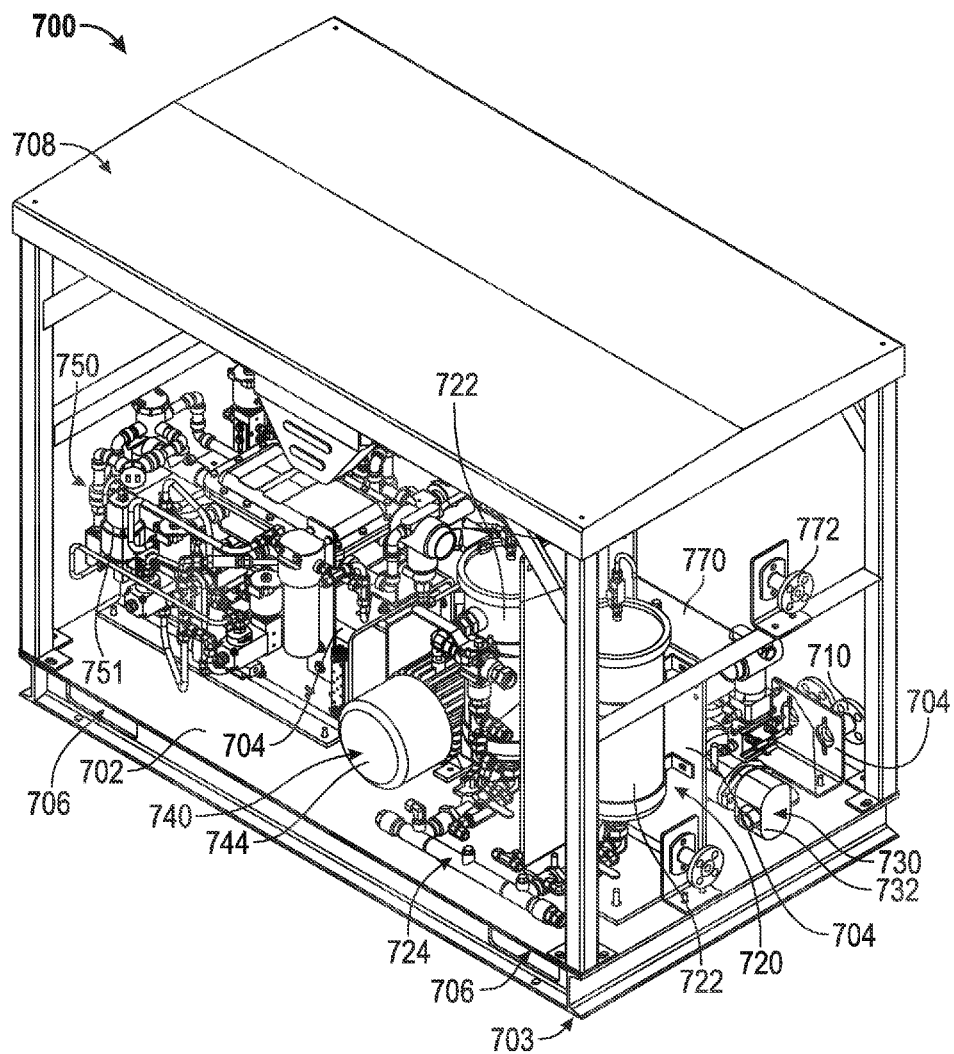
FIG. 2 is an isometric view of an exemplary fuel boost module.
Figure 3:
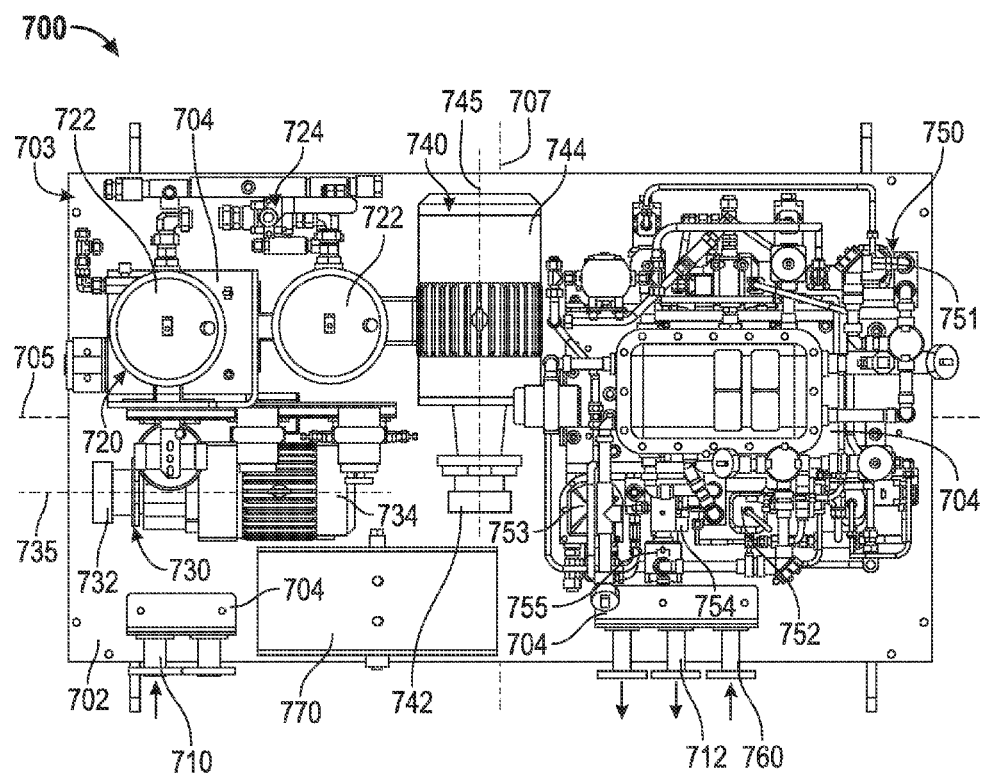
FIG. 3 is a top view of the fuel boost module of FIG. 1 with its cover removed.

FIG. 2 is an isometric view of an exemplary fuel boost module. FIG. 3 is a top view of the fuel boost module of FIG. 2 with its cover removed. Referring to FIG. 2 and FIG. 3 the fuel boost module 700 is described in greater detail. In particular, the fuel boost module 700 is shown as a stand-alone structure having the functional components to supply fuel to the injectors of gas turbine engine. Some of the surfaces and plumbing have been left out or exaggerated for clarity and ease of explanation.

The fuel boost module 700 includes a base 702 and functional components such as a fuel inlet 710, a fuel outlet 712, a filter assembly 720, a boost pump assembly 730, a main pump assembly 740, and a fuel controller 750. The fuel boost module 700 may further include a pressurized gas inlet 760 and a purge tank 770.

The fuel inlet 710 is an interface to couple with a fuel conduit to receive fuel from a fuel supply. In particular, the fuel inlet 710 is a liquid fuel coupling that receives the liquid fuel for the fuel boost module 700. For example, the fuel inlet 710 may include a ¾" 150 LB ANSI RF flange. Also for example, the fuel inlet 710 may include a metric flange, or any conventional coupling meeting the particular specifications of the fuel system and the facility where the gas turbine engine is located. The fuel conduit may include any conventional fuel plumbing and intervening structures.

The fuel outlet 712 is an interface to couple with a fuel conduit to deliver fuel to a gas turbine engine. In particular, the fuel outlet 712 is a liquid fuel coupling that outputs pressurized and regulated liquid fuel from the fuel boost module 700. For example, the fuel outlet 712 may include a ½" 150 LB ANSI RF flange. Also for example, the fuel outlet 712 may include a metric flange, or any other coupling meeting the particular specifications of the fuel system. According to one embodiment, the fuel outlet 712 may include a plurality of outlet lines. For example the fuel outlet 712 may include an outlet line for main fuel, for pilot fuel, and or liquid fuel to torch (i.e. ignition/start up torch).

The filter assembly 720 is a fuel filter configured to filter the liquid fuel before entering the gas turbine engine. In particular, the filter assembly 720 removes contaminants and/or foreign matter from liquid fuel. For example, the filter assembly 720 may include a double stacked (having two filter elements) 10 micron particulate diesel oil filter. Also for example, the filter assembly 720 may include any other fuel filter meeting the particular specifications of the fuel system. According to one embodiment, the filter assembly 720 may be mounted (entirely or partially) to an intervening structure, such as a simple support bracket or an entire support structure. The intervening structure is then coupled to the base 702, via bolts, rivets, weld joints, and/or any other conventional mechanical coupling or joining.

According to one embodiment, the filter assembly 720 may include a plurality of filter elements 722 or canisters. In particular, the filter assembly 720 may include a dual fuel filter assembly. In addition, the filter assembly 720 may include plumbing to provide for replaceability and/or redundancy. For example, as illustrated, the filter elements 722 may be plumbed in parallel with a crossover valve assembly 724 at their outlets. In this configuration, the crossover valve assembly 724 may bypass one of the filter elements 722 during operation, and provide for replacement of the bypassed filter element 722 without suffering downtime of the filter assembly 720.

The boost pump assembly 730 includes a boost pump 732 and a boost pump driver 734 configured to pressurize the liquid fuel entering the fuel boost module 700. In particular, the boost pump assembly 730 is fluidly coupled to and fluidly interspaced between the fuel inlet 710 and the filter assembly 720. The boost pump assembly 730 may be elongated and have a longitudinal axis 735, which may coincide with a drive shaft of the boost pump driver 734.

According to one embodiment, the boost pump assembly 730 is configured to impart sufficient pressure to the fuel to cause the fuel to travel through the filter assembly 720 throughout a duty cycle of the gas turbine engine, and with sufficient residual head to meet any downstream requirements (e.g., minimum inlet pressure of the main pump assembly 740). For example, boost pump 732 may include a fluid pump rated at or around 4.7 GPM (17.8 LPM). Also for example, the boost pump driver 734 may be an electric motor pump rated at or around 1 HP (¾ kW) and 120 VAC or 230 VAC. Alternatively, the boost pump assembly 730 may include any other fuel pump and driver configuration meeting the particular specifications of the fuel system.

According to one embodiment, the boost pump assembly 730 may include a pump filter (not shown). In particular, pump filter may be a separate filter configured to keep foreign objects out of the boost pump assembly 730. For example, the pump filter may be an additional 75 micron boost filter just upstream of boost pump 732.

The main pump assembly 740 includes a main pump 742 and a main pump driver 744 configured to pressurize the liquid fuel before leaving the fuel boost module 700. In particular, the main pump assembly 740 is fluidly coupled to and fluidly interspaced between the filter assembly 720 and the fuel controller 750. The main pump assembly 740 may be elongated and have a longitudinal axis 745, which may coincide with a drive shaft of the main pump driver 744.

According to one embodiment, the main pump assembly 740 is configured to impart sufficient pressure to the liquid fuel throughout a duty cycle of the gas turbine engine, with regulation provided by the fuel controller 750. For example, the main pump 742 may be a fluid pump rated at or around 4.7 GPM (17.8 LPM). Also for example, the main pump driver 744 may be an electric motor pump rated at or around 3 HP (2.2 kW) and 120 VAC or 230 VAC. Alternatively, the main pump assembly 740 may include any other fuel pump and driver configuration meeting the particular specifications of the fuel system.

The fuel controller 750 is a liquid fuel regulator which controls the flow of the liquid fuel to the gas turbine engine. In particular, the fuel controller is fluidly coupled to the fuel outlet 712, and regulates the pressure of the liquid fuel from the main pump assembly 740 to the pressure that will be delivered to the gas turbine engine via the fuel outlet 712. For example the fuel controller 750 may be an assembly of fluid components including valves, meters, switches, sensors, relays, flow paths, and couplings. Additionally, the fuel controller 750 may include simple support bracket or an entire support structure that couples the assembly of fluid components of fuel controller 750 together and provides a mounting interface between the fuel controller 750 and the base 702.

According to one embodiment, the fuel controller 750 (or components thereof) may be configured to perform a variety of functions. In particular, the fuel controller 750 may be configured to provide fuel shutoff, pressure regulation, flow regulation, and/or flow distribution, as well as feedback to a master control console (not shown) of the gas turbine engine. For example, the fuel controller 750 may include a primary fuel shutoff valve 751, a secondary fuel shutoff valve 752, a main fuel control valve 753, a back pressure regulator 754, and a torch fuel shutoff valve 755. In some embodiments, the fuel controller 750 may also include a pilot (or secondary) fuel control valve (not shown).

According to one embodiment, one or more fluid components of the fuel controller 750 may be pneumatically activated. In particular, the fuel controller 750 may include an air interface and associated plumbing to bring air to one or more air powered components. For example, the fuel controller 750 may include a gas or clean air inlet for pilot air (also called "instrument air"—clean, filtered air supplied by the facility), and the plumbing (i.e., air lines, tubing, and/or other conduit) to provide a pneumatic supply to one or more pneumatic solenoid valves. According to one embodiment, at least one of the primary fuel shutoff valve 751, the secondary fuel shutoff valve 752, the main fuel control valve 753, the back pressure regulator 754, the torch fuel shutoff valve 755, and the pilot fuel control valve may include a pneumatic solenoid, a pilot air valve, and/or be pneumatically activated. According to another embodiment, the one or more pneumatic solenoids may be then activated by switches controlled remotely, such as by the master control console (not shown).

The pressurized gas inlet 760 is an interface configured to receive compressed gas or clean air from a compressed gas or clean air supply. In particular, the pressurized gas inlet 760 is a pneumatic coupling that receives and provides compressed gas or clean air to the fuel boost module 700. For example, the pressurized gas inlet 760 may include a standardized flange, or any conventional coupling meeting the particular specifications of the pneumatic system of the fuel boost module 700 and the pressurized gas/clean air supply. According to one embodiment, the pressurized gas inlet 760 may provide clean, compressed air to pilot air valves configured to operate the primary fuel shutoff valve 751 and the secondary fuel shutoff valve 752.

The purge tank 770 is a fuel tank located on the fuel boost module 700 to receive and retain liquid fuel purged from the associated gas turbine engine. In particular, the purge tank 770 is configured to capture excess liquid fuel purged from the fuel lines after the gas turbine engine is shutdown or is switched to another fuel source such as gas fuel (e.g., CNG). For example, the purge tank 770 may be a 4 gallon (15.1 L) reservoir plumbed into a purge system of the gas turbine engine. According to one embodiment, the purge tank 770 may be configured as part of a gravity-fed drain. According to one embodiment, the purge tank 770 may form part of an active circuit where excess fuel is delivered to the purge tank 770 under pressure during an active fuel line purge. According to one embodiment, the purge tank 770 may be configured to supply drained liquid fuel back to the fuel system on demand.

The functional components of the fuel boost module 700 are secured together as a single, portable unit, separate from the support platform of a gas turbine engine. In particular, the functional components of the fuel boost module 700 are mounted to the base 702. For example, each functional component may be mounted directly to the base 702 and/or to support brackets 704 that are mounted to the base 702. In some embodiments, one or more components, such as the fluid and gas interfaces, may be mounted to a cover or a frame-type support structure of the fuel boost module 700 rather than directly to the base 702.

The base 702 may be a structural platform configured to unite and support the functional components of the fuel boost module 700. The functional components may be configured on the base 702 in such a way as to minimize their footprint. The functional components may be further configured on the base 702 with sufficient weight distribution and balance to provide for transportation using conventional means, such as using forklifts, cranes, pallet jacks, etc. In addition, the functional components may be oriented to provide ease of access and maintenance. Furthermore, the functional components may be configured to minimize plumbing quantity and plumbing complexity.

For example, according to one embodiment, the boost pump assembly 730 and the main pump assembly 740 may be positioned to provide greater stability and accessibility. In particular, the boost pump assembly 730 and the main pump assembly 740 may be positioned with their center of gravity toward the center of the base 702 and to provide greater external access to the fuel lines and couplings. For example, the boost pump assembly 730 may be positioned such that the boost pump driver 734 is inboard of the boost pump 732, relative to the base 702. Also for example, the main pump assembly 740 may be positioned such that the main pump driver 744 is inboard of the main pump 742, relative to the base 702.

According to another embodiment, the boost pump assembly 730 and the main pump assembly 740 may be arranged together on the base 702 in an "L-shape", and lying flat on the base. In particular, the boost pump assembly 730 and the main pump assembly 740 may be arranged such that their respective longitudinal axes are substantially parallel with the upper surface of the base 702, and substantially perpendicular to each other. In addition and as illustrated, the "L-shape" may be such that a first corner 703 of the base 702 is substantially cordoned off by the two pumps, leaving a cordoned off area of the base 702 therebetween. The filter assembly 720 may be located in the cordoned off area between the boost pump assembly 730, the main pump assembly 740, and the first corner 703 of the base 702.

In addition, where the boost pump assembly 730 and the main pump assembly 740 are in the "L-shape" described above, they may be further positioned so as to provide greater balance to the base 702. In particular, where the base is rectangular, having a longitudinal centerline 705 and a lateral centerline 707, the boost pump assembly 730 may be aligned with the longitudinal centerline 705, whereas the main pump assembly 740 may be aligned with the lateral centerline 707. Where the boost pump assembly 730 is heavier than the main pump assembly 740, the above positions may be reversed. Also for example, where the filter assembly 720, the boost pump assembly 730, and the main pump assembly 740 are grouped together as described above at the first corner 703, the fuel controller 750 may be positioned so as to balance out the base 702 (e.g., cater-corner to the first corner 703). Alternately, were the fuel boost module 700 includes the purge tank 770, both the fuel controller 750 and the purge tank 770 may be positioned so as to balance out the base 702 (e.g., fuel controller 750 opposite the boost pump assembly 730 and purge tank 770 opposite the main pump assembly 740).

According to one embodiment, only a single level is used. In other words, all the functional components are mounted in a single level. In particular, the functional components are distributed and mounted directly and/or indirectly (e.g., using support brackets 704 or joining assemblies) to the base 702, without an intervening second level floor or second base. According to another embodiment, all the functional components excepting one or more of the fuel and air interfaces are mounted in a single level.

According to one embodiment, the base 702 may conform to one or more pallet standards. For example, the base 702 may configured to conform in dimension (e.g., width and length) and entry to one or more pallet standards. The pallet standards may be promulgated by, for example, International Organization for Standardization (ISO), Grocery Manufacturers' Association (GMA), European Pallet Association (EPAL), Australian Standard Pallet, DOD (e.g., MIL-STD-1660), etc. According to one embodiment, the base 702 may measure approximately 60.00"×36.00" (1524 mm×914 mm). According to another embodiment, the base 702 may measure no more than 48.00"×40.00" (1219 mm×1016 mm). According to another embodiment, the base 702 may measure between 60.00"×48.00' (1524 mm×1219 mm) and 40.00"×35.00 (1016 mm×889 mm). According to another to another embodiment, the base 702 may include a two-way or a four way entry 706, where each entry is configured to receive conventional forklift tongs and be therein lifted. For example, the entry 706 may include openings of a size and spacing to receive conventional forklift tongs. Moreover, the weight distribution on the base 702 may be sufficiently such that a forklift may lift and transport the fuel boost module 700 via the entry 706.

According to one embodiment, the fuel boost module 700 may also include a cover 708. As illustrated, the cover 708 may be a frame-type cover. In particular, the cover 708 may include vertical supports joined to the corners of the base 702 and configured to provide additional structural support and increase overall strength and rigidity to the base 702. Also, the cover 708 may include one or more horizontal cross beams between the vertical supports to provide landing areas for additional features, interfaces, and components (e.g., purge tank inlet interface 772), as well as structural support. In addition, as a frame-type cover, the cover 708 may include substantially open sides, providing open side access to the functional components resident on the base 702. According to one embodiment, the cover 708 may cover the top of the fuel boost module 700 while leaving the sides of the fuel boost module 700 exposed. According to one embodiment, the cover 708 may cover at least 75% of the top of the fuel boost module 700 while leaving at least 75% of the sides of the fuel boost module 700 exposed.

INDUSTRIAL APPLICABILITY

The present disclosure generally applies to a fuel boost module for a gas turbine engine. The described embodiments are not limited to use in conjunction with a particular type of gas turbine engine. Gas turbine engines, and thus their components and support systems, may be suited for any number of industrial applications, such as, but not limited to, various aspects of the oil and natural gas industry (including transmission, gathering, storage, withdrawal, and lifting of oil and natural gas), power generation industry, aerospace and transportation industry, to name a few examples.

Generally, embodiments of the presently disclosed fuel boost module are applicable to the use, operation, maintenance, repair, and improvement of gas turbine engines, and may be used in order to improve performance and efficiency, decrease maintenance and repair, and/or lower costs. In addition, embodiments of the presently disclosed fuel boost module may be applicable at any stage of the gas turbine engine's life, from design to prototyping and first manufacture, and onward to end of life. Accordingly, the fuel boost module may be used in conjunction with a retrofit or enhancement to existing gas turbine engine, as a preventative measure, or even in response to an event.

In particular, the presently disclosed fuel boost module may provide for improved access and coordination of various components of the gas turbine engine's fuel delivery systems. For example, the "L-shape" configuration described above leaves the filter elements and crossover valve assembly exposed for accessibility and ease of removal even during engine operation. Moreover the presently disclosed liquid fuel boost module may free space or "real estate" on the support platform of the gas turbine, allowing for access and upgrades to the existing gas turbine engines and new designs, which may have been previously unavailable.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a stationary gas turbine engine, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A fuel boost module for a gas turbine engine, the fuel boost module comprising:
   a base separate from a support platform for the gas turbine engine;
   a fuel inlet;
   a fuel outlet configured to be fluidly coupled to the gas turbine engine;
   a filter assembly coupled to the base;
   a fuel controller coupled to the base and fluidly coupled to the fuel outlet, the fuel controller configured to regulate pressure of the fuel delivered to the gas turbine engine via the fuel outlet;
   a boost pump assembly having a first longitudinal axis substantially parallel with an upper surface of the base, the boost pump assembly being arranged on and coupled to the base, and fluidly coupled to and interspaced between the fuel inlet and the filter assembly; and
   a main pump assembly having a second longitudinal axis substantially parallel with the upper surface of the base and substantially perpendicular to the first longitudinal axis, the main pump assembly being arranged flat on and coupled to the base, and fluidly coupled to and interspaced between the filter assembly and the fuel controller.

2. The fuel boost module of claim 1, wherein the boost pump assembly and the main pump assembly are further arranged such that a first corner of the base is substantially cordoned off by the boost pump assembly and the main pump assembly, leaving a cordoned off area; and
   wherein the filter assembly is located in the cordoned off area between the boost pump assembly, the main pump assembly, and the first corner of the base.

3. The fuel boost module of claim 1, wherein the filter assembly includes a first filter element and a second filter element fluidly in parallel with each other; and
   wherein the filter assembly further includes a crossover valve assembly, the crossover valve assembly configured to bypass the first filter element or the second filter element during operation.

4. The fuel boost module of claim 1, wherein the fuel controller includes
   a primary fuel shutoff valve,
   a secondary fuel shutoff valve,
   a main fuel control valve,
   a pilot fuel control valve, and
   a torch fuel control valve.

5. The fuel boost module of claim 1, further comprising a pressurized gas inlet, the pressurized gas inlet configured to receive compressed air from off board the fuel boost module, and further configured to supply compressed air to one or more functional components of the fuel boost module.

6. The fuel boost module of claim 1, further comprising a purge tank, the purge tank configured to receive and retain fuel purged from the gas turbine engine.

7. The fuel boost module of claim 1, further comprising a cover, the cover covering at least 75% of the top of the fuel boost module while leaving at least 75% of the sides of the fuel boost module exposed.

8. The fuel boost module of claim 1, wherein the base includes at least a two-way entry, the entry including an opening of a size and spacing to receive conventional forklift tongs.

9. A gas turbine engine system comprising:
   a gas turbine engine package including a gas turbine engine and an enclosure, the gas turbine engine having a fuel system, the enclosure housing the gas turbine engine; and
   the fuel boost module of claim 1, fluidly coupled to the fuel system of the gas turbine engine and positioned outside of the gas turbine engine package.

10. A fuel boost module for a gas turbine engine, the fuel boost module comprising:
    a base disposed separate from a support platform for the gas turbine engine;
    a fuel inlet;
    a fuel outlet fluidly coupled to the gas turbine engine;
    a filter assembly coupled to the base;
    a boost pump assembly having a first longitudinal axis, and including a boost pump and a boost pump driver, the boost pump assembly coupled to the base, the boost pump fluidly coupled to and interspaced between the fuel inlet and the filter assembly; and
    a main pump assembly having a second longitudinal axis substantially perpendicular to the first longitudinal axis, the main pump assembly including a main pump and a main pump driver, the main pump assembly coupled to the base, the main pump fluidly coupled to the filter assembly.

11. The fuel boost module of claim 10, wherein the boost pump assembly and the main pump assembly are further arranged such that a first corner of the base is substantially cordoned off by the boost pump assembly and the main pump assembly, leaving a cordoned off area therebetween; and
   wherein the filter assembly is located in the cordoned off area between the boost pump assembly, the main pump assembly, and the first corner of the base.

12. The fuel boost module of claim 10, wherein the filter assembly includes a first filter element and a second filter element fluidly in parallel with each other; and
   wherein the filter assembly further includes a crossover valve assembly, the crossover valve assembly configured to bypass the first filter element or the second filter element during operation.

13. The fuel boost module of claim 10, further comprising a fuel controller, the fuel controller coupled to the base and fluidly coupled to the fuel outlet and the main pump assembly.

14. The fuel boost module of claim 13, wherein the fuel controller includes
   a primary fuel shutoff valve,
   a secondary fuel shutoff valve,
   a main fuel control valve, a pilot fuel control valve, and
   a torch fuel control valve.

15. The fuel boost module of claim 10, further comprising a pressurized gas inlet, the pressurized gas inlet configured to receive compressed air from off board the fuel boost module, and further configured to supply compressed air to one or more functional components of the fuel boost module.

16. The fuel boost module of claim 10, further comprising a purge tank, the purge tank configured to receive and retain fuel purged from the gas turbine engine.

17. The fuel boost module of claim 10, wherein the base includes a plurality of corners, the fuel boost module further comprising a cover, the cover including vertical supports joined to the corners of the base configured to provide additional structural support to the base, the cover covering at least 75% of the top of the fuel boost module while leaving at least 75% of the sides of the fuel boost module exposed.

18. The fuel boost module of claim 10, wherein the base measures between 60.00"×48.00" and 40.00"×35.00".

19. A gas turbine engine system comprising:
   a gas turbine engine package including a gas turbine engine and an enclosure, the gas turbine engine having a fuel system, the enclosure housing the gas turbine engine; and
   the fuel boost module of claim 10, fluidly coupled to the fuel system of the gas turbine engine and positioned outside of the gas turbine engine package.

* * * * *